(12) United States Patent
Ramamohan et al.

(10) Patent No.: US 12,321,373 B2
(45) Date of Patent: Jun. 3, 2025

(54) SEARCH TOOL FOR IDENTIFYING AND SIZING CUSTOMER ISSUES THROUGH INTERACTION SUMMARIES AND CALL TRANSCRIPTS

(71) Applicant: Capital One Services, LLC, McLean, VA (US)

(72) Inventors: Deepak Ramamohan, Karnataka (IN); Joydeep Dasgupta, Bangalore (IN)

(73) Assignee: Capital One Services, LLC., McLean, VA (US)

( * ) Notice: Subject to any disclaimer, the term of this patent is extended or adjusted under 35 U.S.C. 154(b) by 0 days.

(21) Appl. No.: 17/970,019

(22) Filed: Oct. 20, 2022

(65) Prior Publication Data
US 2023/0385316 A1    Nov. 30, 2023

(51) Int. Cl.
*G06F 16/334* (2025.01)
*G06F 16/31* (2019.01)

(52) U.S. Cl.
CPC ........ *G06F 16/3344* (2019.01); *G06F 16/313* (2019.01); *G06F 16/316* (2019.01)

(58) Field of Classification Search
CPC ........... G06F 16/24578; G06F 16/9538; G06F 16/248; G06F 16/438; G06F 16/338; G06F 16/245; G06F 16/3347; G06F 16/93; G06F 16/3329; G06F 16/3344
See application file for complete search history.

(56) References Cited

U.S. PATENT DOCUMENTS

| | | | | |
|---|---|---|---|---|
| 2016/0070748 | A1* | 3/2016 | Firat | G06F 16/2425 707/730 |
| 2021/0182495 | A1* | 6/2021 | Truong | G06F 16/2457 |
| 2021/0319033 | A1* | 10/2021 | Zhang | G06F 16/953 |

OTHER PUBLICATIONS

Comparative Analysis of Sparse Matrix Algorithms for Information Retrieval, by Goharian, computer, 2003•ilisci.org, p. 38-46 (Year: 2003).*

* cited by examiner

*Primary Examiner* — Hau H Hoang
(74) *Attorney, Agent, or Firm* — KDW FIRM PLLC

(57) ABSTRACT

The exemplary embodiments may provide a search tool that can locate customer issues in call transcripts and agent notes and can provide an accurate count of how often such issues appear in the call transcripts and agent notes. The exemplary embodiments may improve the speed with which the search of documents is performed. The exemplary embodiments rely upon a document matrix that is computed once for a given corpus of documents and a given vocabulary of the documents. The document matrix may be used across multiple queries. The exemplary embodiments also account for similar terms in processing a query. The exemplary embodiments may use a word coverage factor to improve the relevance of the search results returned by the search tool. The word coverage factor acts as a multiple factor that computes the fraction a query terms that are present in a document.

20 Claims, 16 Drawing Sheets

| Query: "loan extension" Query Vector Q (100x1) ||
|---|---|
| possible | 0 |
| loan | 1 |
| extension | 1 |
| deferment | 0 |
| monthly | 0 |
| payments | 0 |
| ... | ... |
| ... | ... |

Figure 5B

| | ... | extension | deferment | ... |
|---|---|---|---|---|
| ... | | | | |
| extension | | 1 *716* | 0.78 *712* | |
| deferment | | 0.78 *714* | 1 *718* | |
| ... | | | | |

Similarity Matrix P (100x100)

Figure 7

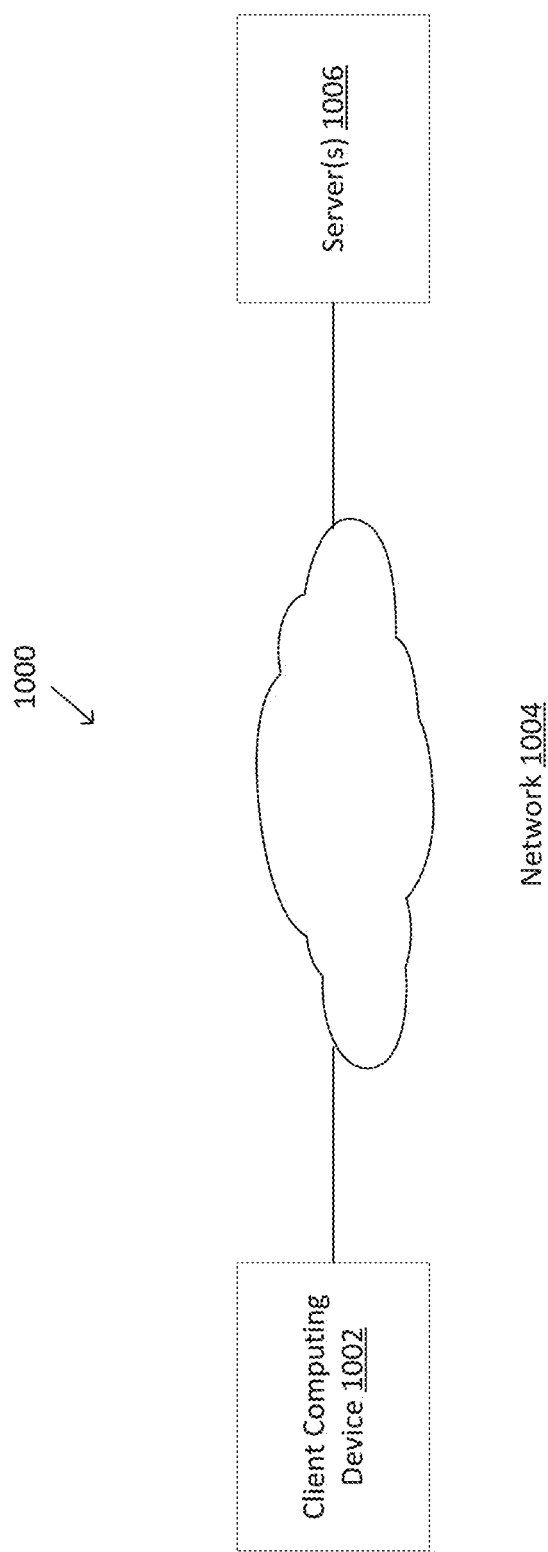

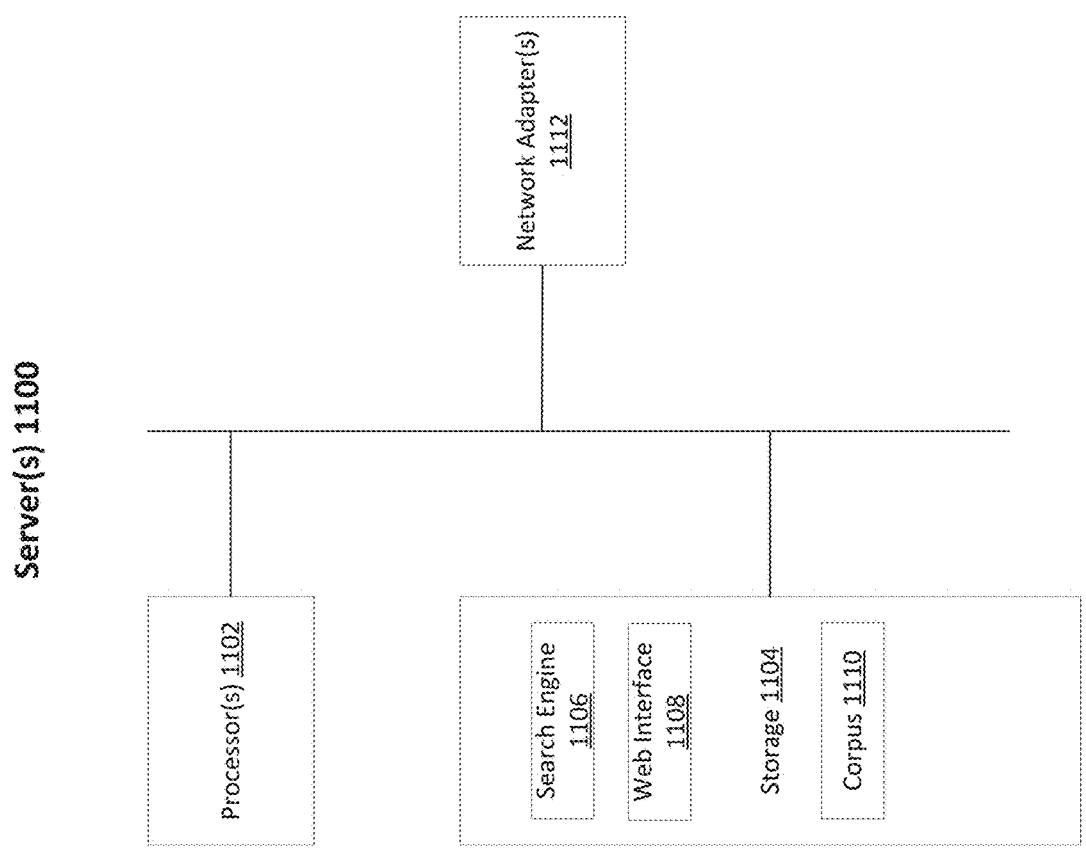

SEARCH TOOL FOR IDENTIFYING AND SIZING CUSTOMER ISSUES THROUGH INTERACTION SUMMARIES AND CALL TRANSCRIPTS

CROSS-REFERENCE TO RELATED APPLICATIONS

This application claims the benefit of priority application India Application No. 202221030288, filed May 26, 2022, the disclosure of which is incorporated herein by reference in its entirety.

BACKGROUND

Many organizations receive calls from customers regarding customer issues, such as complaints or questions. These calls are fielded by customer agents who attempt to address the customer issues. The information obtained during such customer calls may be useful to a company. For example, product engineers may want to know of any problems with a product. Sales managers may wish to know what features of a product are liked by a customer and what features of the product are disliked by the customer. As such, some organizations record the customer calls and have the agents record notes regarding the customer calls. The call recordings may be converted into text transcripts using speech-to-text engines.

For large companies, the call transcripts and agent notes may constitute a large amount of textual data that cannot be processed manually. Millions of terms may be found in the textual data. Hence, conventionally some companies apply a programmatic search tool to the call transcripts and agent notes. Unfortunately, conventional programmatic search tools have limitations when searching the call transcripts and agent notes. One of the primary limitations is identifying how many customers have a particular issue (known as sizing). The conventional search tools produce estimates of sizing that are noisy and unreliable.

Another limitation of the conventional search tool is that it can be very time-consuming when searching a large corpus of documents. For each search query, the conventional programmatic search tools process each document to be searched.

A further limitation of the conventional search tool is that it only searches for terms in the query. The conventional search tool does not search for synonyms and/or variations of the terms in the query. Thus, the conventional query may miss related text that uses variations or synonyms of the terms in the query.

SUMMARY

In accordance with a first inventive aspect, a method is performed by a processor of a computing device. Per the method, a query containing one or more terms is received. A corpus of documents is processed with the processor to determine how relevant the documents are to the query. The processing comprises scoring the documents in the corpus with the processor for relevance, and the scoring is a product of at least a sparse document matrix and a query vector. Each entry in the sparse document matrix holds a contribution value of an associated term in an associated one of the documents in the corpus, and the query vector holds values for terms in the query. The documents in the corpus are sorted with the processor by scores assigned by the scoring. Responsive to the query, output identifying the best scoring ones of the documents is generated based on the sorting.

Columns in the sparse document matrix may be associated with terms that are part of a vocabulary of the documents, and rows may be associated with documents in the corpus of documents. The contribution value may specify a measure of a contribution that the associated term contributes to the relevance of the associated one of the documents to the query. The contribution value may be based in part on an inverse document frequency weight of the associated term. The query vector may include values for the terms in the vocabulary indicating if the terms are in the query. The query vector may have a row per term in the vocabulary.

Per another inventive aspect, a method is performed by a processor of a computing device. A query containing one or more terms is received by the processor. A corpus of documents is processed with the processor to determine the relevance of the documents to the query. The processing includes scoring the documents in the corpus with the processor for relevance, and the scoring is a product of at least a sparse document matrix, a similarity matrix and a query vector. Each entry in the sparse document matrix holds a contribution value of an associated term in an associated one of the documents in the corpus. The similarity matrix holds values indicating a degree of similarity between term pairs, and the query vector holds values for terms in the query. The documents in the corpus are sorted with the processor by scores assigned by the scoring. Responsive to the query, output identifying the best scoring ones of the documents is generated based on the sorting.

The values in the similarity matrix may range from 0 to 1, wherein a value of 1 indicates that terms in the term pair are the same and 0 indicates that the terms in the term pair are dissimilar. The term pairs may be in the vocabulary of the documents. In some instances, the vocabulary may be defined as all the words found in the documents. The values in the similarity matrix may be based on, for example, cosine similarity values, Levenshtein distance values and/or edit distance values. Rows of the similarity matrix may be associated with terms in the vocabulary, and Columns in the similarity matrix may be associated with terms in the vocabulary. Columns in the sparse document matrix may be associated with terms that are part of the vocabulary, and rows in the sparse document matrix may be associated with documents in the corpus of documents. The query vector may include values for the terms in the vocabulary indicating if the terms are in the query.

In a further inventive aspect, a method is performed by a processor of a computing device. The method includes receiving a query containing one or more terms. The method also includes processing a corpus of documents with the processor to determine if each of the documents is relevant to the query. The processing comprises scoring the documents in the corpus with the processor for relevance, and the scoring is a product of at least a sparse document matrix, a query vector and word coverage factor vector. Each entry in the sparse document matrix holds a contribution value of an associated term in an associated one of the documents in the corpus. The query vector holds values for terms in the query. The word coverage factor vector holds a value for each of the documents in the corpus. The documents in the corpus are sorted with the processor by scores assigned by the scoring. Responsive to the query, output identifying best scoring ones of the documents is generated based on the sorting.

The values in the word coverage factor vector may identify what fraction of terms in the query appear in the associated documents in the corpus. One of the values in the word coverage factor vector for a selected document in the corpus may be a sum of an incidence of each of the terms in the query in the selected document divided by a number of terms in the query. The scoring may be a product of the sparse document matrix, a similarity matrix, the query vector, and the word coverage factor vector, and the similarity matrix may hold values indicating a degree of similarity between term pairs. The values in the similarity matrix may range from 0 to 1, wherein a value of 1 indicates that terms in the term pair are the same and 0 indicates that the terms in the term pair are dissimilar. One of the values in the word coverage factor vector for a given document in the corpus may be a sum of an incidence of each of the terms in the query in the given document and each of the terms having a non-zero value in the similarity matrix with terms in the query in the given document divided by a number of terms in the query. The contribution value may specify a measure of a contribution the associated term contributes to a relevance of the associated one of the documents to the query.

BRIEF DESCRIPTION OF THE DRAWINGS

FIG. 5B depicts a portion of an illustrative query vector suitable for use in exemplary embodiments.

FIG. 7 depicts a portion of an illustrative similarity matrix suitable for use in exemplary embodiments.

FIG. 10 depicts an illustrative distributed environment for a client/server arrangement suitable for use in exemplary embodiments.

FIG. 11 depicts a block diagram of server(s) suitable for use in exemplary embodiments in a client/server arrangement.

DETAILED DESCRIPTION

Exemplary embodiments described herein may address the sizing problem of conventional search tools. The exemplary embodiments may provide a search tool that can locate customer issues in call transcripts and agent notes and can provide an accurate count of how often such issues appear in the call transcripts and agent notes. This is very useful information to companies and other organizations that process call transcripts and agent notes.

The exemplary embodiments may improve the speed with which the search of documents is performed. Instead of processing each of the documents in a corpus of documents each time a search query ("query") is submitted, the exemplary embodiments rely upon a document matrix that is computed once for a given corpus of documents and a given vocabulary, which be defined as the words with in the corpus of documents. The document matrix may be used across multiple queries. The document matrix may hold the contribution value for each term in the vocabulary for all of the documents in the corpus. The scoring of the relevance of documents relative to a query may be realized as a matrix operation involving the document matrix and a query vector. The query vector may indicate what terms in the vocabulary appear in the associated query. Since the document matrix only needs to be computed a single time, the speed of processing of documents may be greatly increased.

The exemplary embodiments also account for similar terms in processing a query. For example, suppose that the query contains the terms "loan" and "extension." Instead of searching just for the query terms, the exemplary embodiments may also search for similar terms, such as "deferment." By searching for similar terms in the documents, the exemplary embodiments provide a more inclusive search that finds documents that may be relevant but that do not use the exact terms of the query. The exemplary embodiments may account for similar terms by employing a similarity matrix. The similarity matrix holds similarity values for similar terms in the vocabulary. When the similarity matrix is used, the scoring of the documents may entail multiplying the document matrix by the similarity matrix and the query vector.

The exemplary embodiments may use a word coverage factor to improve the relevance of the search results returned by the search tool. The word coverage factor acts as a multiplying factor that specifies the fraction of query terms that are present in a document. The word coverage factor may be calculated for each document of the corpus, and the resulting word coverage factor vector may be multiplied with the document matrix, the similarity matrix, and the query vector to produce scores for the documents in the corpus.

Figure 1:
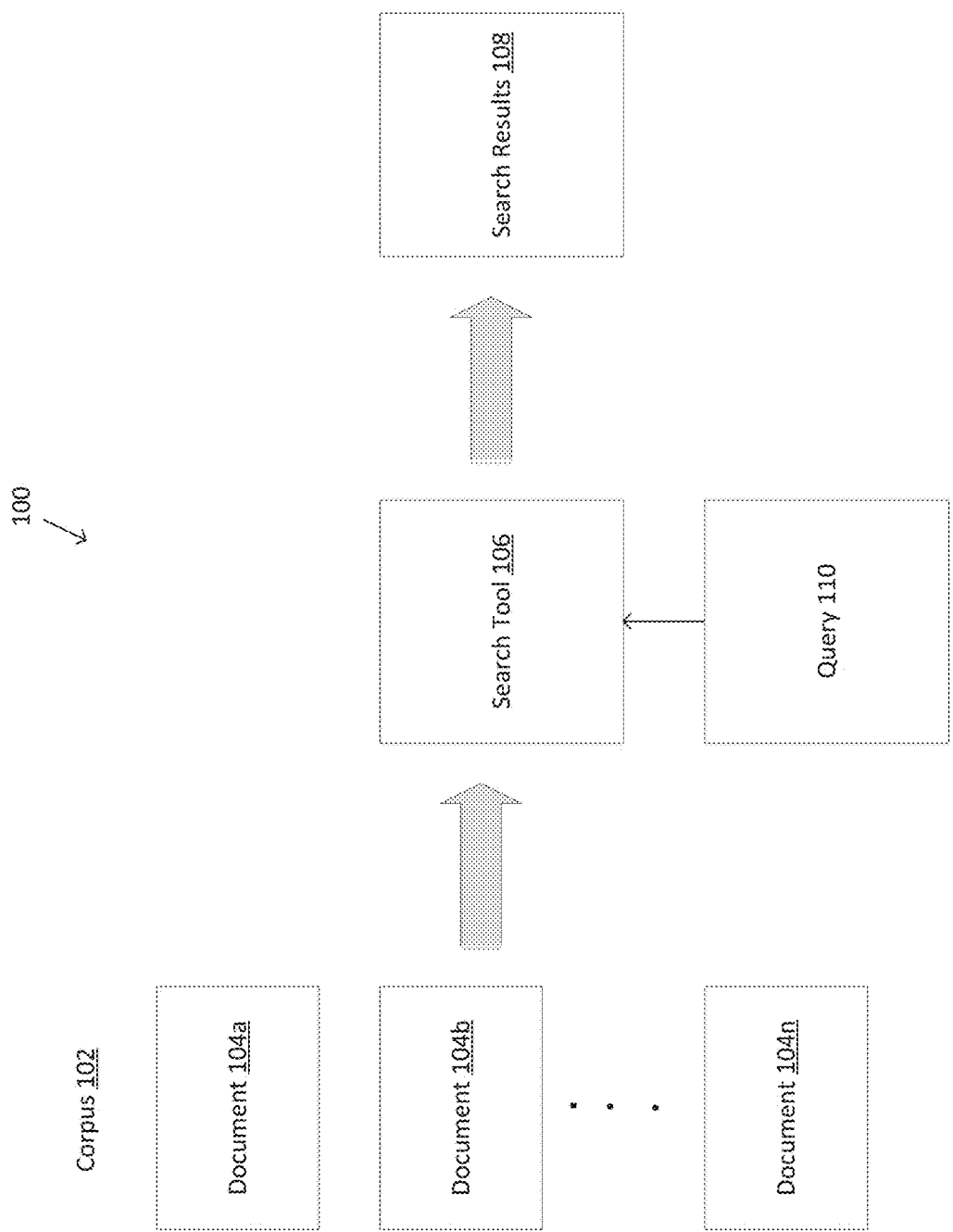
FIG. 1 depicts an input and outputs of a search tool in exemplary embodiments.

FIG. 1 depicts a diagram 100 illustrating the inputs and outputs for a search tool 106 of the exemplary embodiments. The search tool 106 may be implemented in computer programming instructions and may be realized as an application program, module, or the like. The search tool 106 receives or has access to a corpus of documents 102 as input. The documents 104*a*, 104*b*, . . . , 104*n* that form the corpus 102 are processed by the search tool 106 to identify which of the documents are the most relevant to a query 110. The query 110 contains search terms. The search tool 106 looks for the search terms of the query 110 and possibly similar terms in the documents of the corpus 102. After processing the documents in the corpus 102, the search tool 106 produces search results 108. The search results 108 may be a sorted list of the most relevant documents from the corpus 102. The sorted list may take the form of hyperlinks to the documents or merely an indication of the identity of the documents. The search results 108, more generally, may contain references to the relevant documents for enabling access to the documents and may provide an indication of the degree of relevance of each document, such as by the position of the document in a sorted order or by providing a score for each document next to a document identifier.

Figure 2:
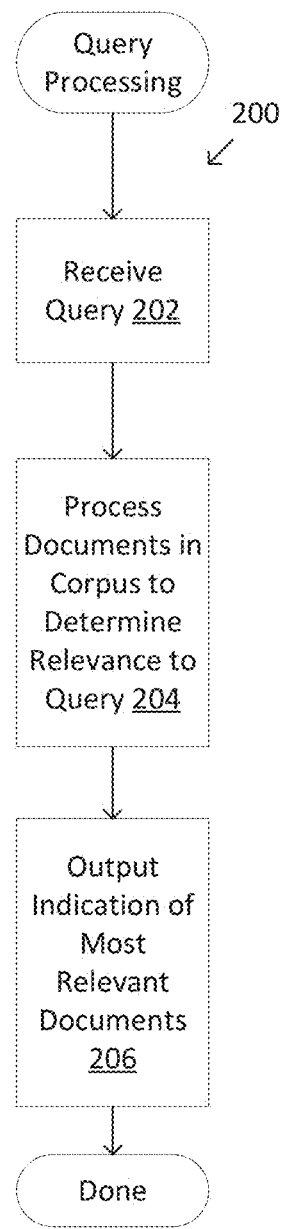
FIG. 2 depicts a flowchart of illustrative steps that may be performed in exemplary embodiments to process a search query with the search tool.

FIG. 2 depicts a flowchart 200 of illustrative steps that may be performed in exemplary embodiments in processing the query 110. The processing begins when the search tool receives the query 110 (202). The query 110 may be entered by a user typing the query via a user interface, such as a graphical user interface of an online or localized platform. Alternatively, the query 110 may be submitted programmatically from a computer program or other programmatic entity to the search tool 106. The query 110 includes one or more search terms. As mentioned above, the search tool 106 then processes the documents in the corpus 102 to determine their relevance to the received query 106 (204). Once the processing is complete, the search tool 106 outputs an indication of the most relevant documents as discussed above (206).

Figure 3A:
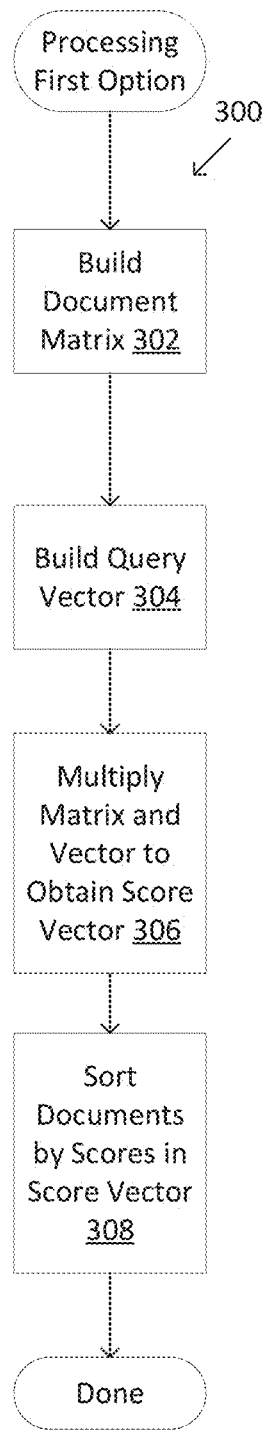
FIG. 3A depicts a flowchart of illustrative steps that may be performed in exemplary embodiments to process documents per a first option.

The scoring of the relevance of documents in the corpus 102 may be performed in any of a number of different ways in the exemplary embodiments. FIG. 3A depicts a flowchart 300 of illustrative steps that may be performed in exemplary embodiments in a first option. Initially, a document matrix is built by determining and adding to the document matrix contribution values for each term in the vocabulary for each document (302). The document matrix is only built once, not for each search query. In one example, the document matrix may be built prior to a first search query and support any number of search queries. The contribution value indicates how much a term contributes to the relevance of the associated document to the query. A query vector is then built (304). The query vector has an entry for each term of the vocabulary. Each entry indicates whether the associated term in the vocabulary is part of the query or not. The document matrix is then multiplied by the query vector to obtain a score vector for each document (306). The documents are then sorted by the associated scores found in the score vector (308).

Figure 3B:
FIG. 3B depicts a calculation of a score vector for documents in a corpus using a document matrix and a query vector.

As shown in FIG. 3B, the calculation 310 of the score vector 312 entails a matrix multiplication of the document matrix 314 with the query vector 316 to produce a score vector 312, which holds a score for each document in the corpus 102. In some exemplary embodiments, each document being scored is associated with a row in the score vector 312, and the score for the document is held in the associated row. The document matrix 314 may be organized to have a separate row for each document. Each column in the document matrix 314 may be associated with a word in the vocabulary. Each row of the query vector 316 may be associated with a term in the vocabulary.

Figure 4A:
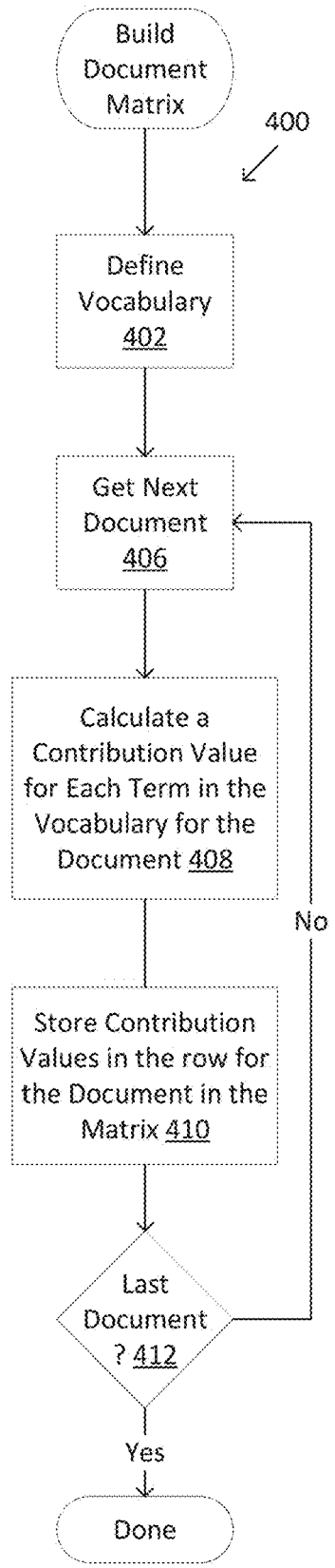
FIG. 4A depicts a flowchart of illustrative steps that may be performed in exemplary embodiments to build the document matrix.

FIG. 4A depicts a flowchart 400 of illustrative steps that may be performed in exemplary embodiments to build the document matrix. The vocabulary is defined (402). The vocabulary should encompass all the terms likely to be in a query and any similar terms. Similar terms may be determined from one or more synonyms of actual terms in a document and/or by utilizing a similarity matrix as discussed below. The vocabulary may be application-specific. For instance, where the corpus holds documents containing call transcripts and agent notes for a banking organization, the vocabulary may contain terms relating to services and products offered by the banking organization. The vocabulary may contain terms commonly found in the corpus of documents. If the application is concerned with problems and customer issues, the vocabulary may include terms relating to the problem and the issues.

The next document to be processed is obtained (406). Initially, the next document is the first document in the corpus 102 to be processed. A contribution value is calculated for each term in the vocabulary for the document (408). The matrix value may be expressed as:

$$\mathscr{U}_{i,j} = IDF(q_i) \frac{f(q_i)(k_1 + 1)}{f(q_i) + k_1\left(1 - b + b\frac{|D_i|}{avg_{dl}}\right)}$$

where i is an index value for the documents, j is an index for the vocabulary terms, $k_1$ is a constant, b is a constant, $q_i$ is a term that appears in the document I, $IDF(q_i)$ is the inverse document frequency weight of the term $q_i$, $f()$ is a frequency function, $avg_{dl}$ is the average document length, $|D_i|$ is the number of terms in the document $D_i$. This equation is derived from the BM25 ranking function. $IDF(q_i)$ can expressed as:

$IDF(q_i) = \ln((N - n(q_i) + 0.5)/n(q_i) + 0.5) + 1)$ where N is the total number of documents in the corpus and $n(q_i)$ is the number of documents containing $q_i$.

The contribution values are stored in the row associated with the document being processed and in the column for the associated vocabulary word (410). A check is made whether the document is the last document to be processed in the corpus 102. If so, the building of the document matrix is complete. If not, the process repeats, beginning at 406 with the next document to be processed.

Figure 4B:
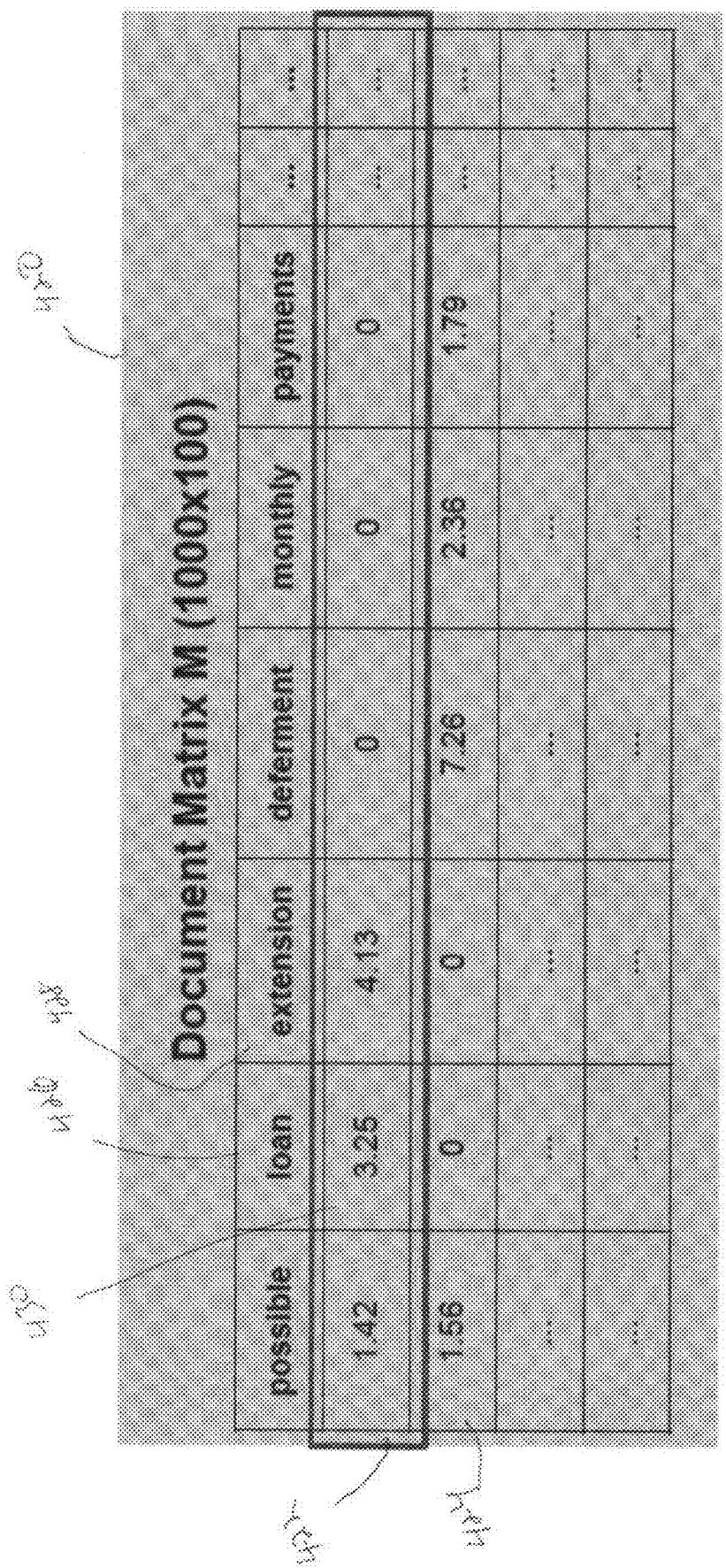
FIG. 4B depicts a portion of an illustrative document matrix suitable for use in exemplary embodiments.

FIG. 4B depicts an illustrative document matrix 420. As mentioned, the document matrix 420 may be built once and support any number of search queries. The document matrix 420 contains 1000 rows, with a separate row for each of 1000 documents in the corpus 102. Thus, row 422 is associated with a first document, and row 424 is associated with a second document. The document matrix contains 100 columns, with each column being associated with a term in the documents. FIG. 4B lists the terms associated with the respective columns. For example, column 426 is associated with the term "loan" and column 428 is associated with the term "extension." Each entry holds the contribution value for the associated word in the associated document. For example, entry 430 holds a contribution value of 3.25 for "loan" in the document associated with row 422.

Figure 5A:
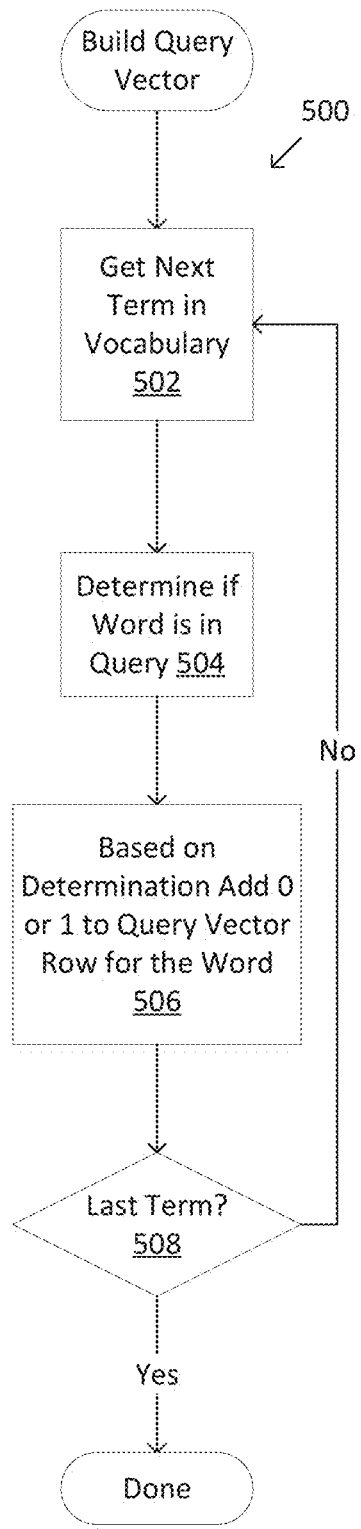
FIG. 5A depicts a flowchart of illustrative steps that may be performed in exemplary embodiments to build the query vector.

FIG. 5A depicts a flowchart 500 of illustrative steps that may be performed in exemplary embodiments to build a query vector 316. At block 502, the processing may include determining another term in a document for processing (502). For example, the processing may include processing each term in each document on a term-by-term basis. However, embodiments are not limited in this manner. For example, embodiments may include limiting processing words that have a particular length, e.g., greater than three letter.

A determination of whether the term is in the query 110 is made (504). Based on this determination, a 1 or 0 is added to the query vector in the row for the term (506). A value of 1 indicates that the term is in the query 110, and a value of 0 indicates that the term is not in the query 110. In some instances, to limit an amount of storage required to store the vector, the processing may include only storing a value of a 1 if a term is in a query and does not store a value for a term not in the query. Thus, the processing builds the vector by processing each term present in a document(s) and then add its corresponding value to the sparse matrix/vector. A check of whether the term is the last term in the document(s) is made (508). If not, there are more terms in the document(s) to be processed, and the process repeats with the next term at 502. If it is the last term, processing stops as all of the terms in the document(s) have been processed.

FIG. 5B shows an example of a portion of a query vector 520. The query vector 520 is for the query "loan extension." Since, the term "possible" is not part of the query, the value in row 522 is 0. However, since the query contains both "loan" and "extension", rows 524 and 526 for those respective terms hold a value of 1. The query vector may hold different values in alternative embodiments. The choice of 0 and 1 is driven by being useful in performing the matrix multiplication for the scoring. Additionally, and as previously explained, the query vector 520 may not store any value for a term that is not in a document, but only store the indices of non-zero entries and their corresponding values, e.g., loan and extension.

Figure 6A:
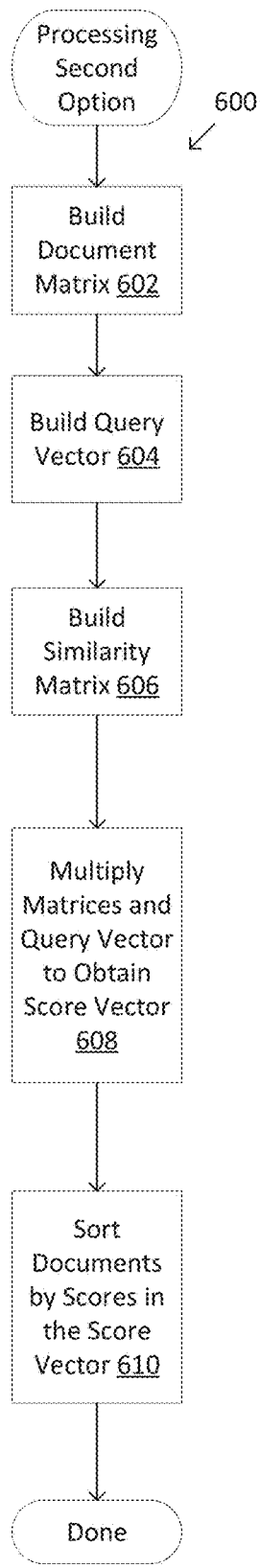
FIG. 6A depicts a flowchart of illustrative steps that may be performed in exemplary embodiments to process documents per a second option.

A second option for processing the documents to score them for relevance is to add a similarity matrix to the approach of the first option depicted in FIG. 3A. FIG. 6A depicts a flowchart 600 of illustrative steps that may be performed in exemplary embodiments in accordance with the second processing option. A document matrix is built (602) as described above, and a query vector is built (604) as described above. A similarity matrix is built (606), as will be described below. The similarity matrix holds similarity values for terms in the vocabulary. The values indicate how similar the term is relative to another term in the document (s). The values in the similarity matrix may be based on, for example, cosine similarity values, Levenshtein distance values, and/or edit distance values. The values range from 0 to 1, with 0 indicating dissimilarity and 1 indicating the terms being the same. Each row is associated with a term in the document(s), and each column is associated with a term in the document(s).

The matrices and the query vector are multiplied to obtain the score vector (608).

Figure 6B:
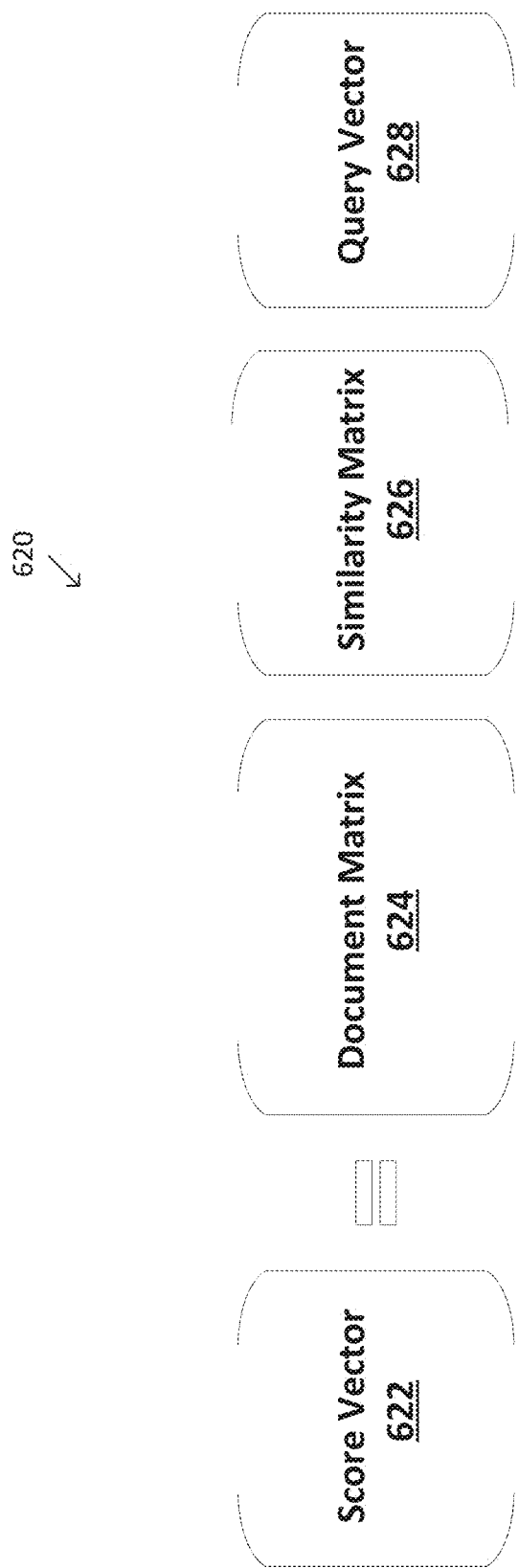
FIG. 6B depicts a calculation of a score vector for documents in a corpus using a document matrix, a similarity matrix, and a query vector.

FIG. 6B depicts the calculation 620 that may be performed in the exemplary embodiments to calculate the score vector 622. The document matrix 624 is multiplied by the similarity matrix 626 and the query vector 628 to yield the score vector to identify the most relevant documents. The addition of the similarity matrix 626 causes documents containing terms that are similar to the terms in the search query to also be given weight when determining the relevance of documents to the search query. This helps include documents in the relevant search results that contain similar language that does not exactly match the search terms in the search query.

FIG. 7 depicts an example of a similarity matrix 700. The similarity matrix is for a 100-word vocabulary from the documents and thus is 100×100 in dimensions. Row 702 is for the term "extension," and row 704 is for the term "deferment." Column 706 is for the term "extension," and column 708 is for the term "deferment." Entry 710 holds a value of 0.78, which indicates that "deferment" is similar to "extension." Entry 714 is for the same pair of terms and also holds a value of 0.78. Entry 712 holds a value of 1, indicating the column and the row are both associated with the term "deferment." Likewise, entry 716 holds a value of 1, as both the row and the column are associated with "extension."

Figure 8A:
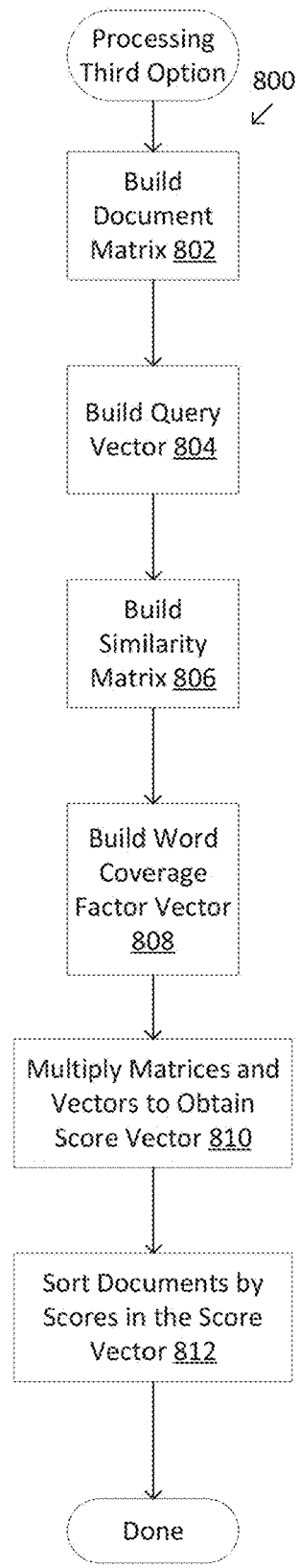
FIG. 8A depicts a flowchart of illustrative steps that may be performed in exemplary embodiments to process documents per a third option.

FIG. 8A depicts a flowchart of illustrative steps that may be performed in exemplary embodiments in a third processing option for processing documents in the corpus to determine their relevance to a query. The third option is like the second option of FIG. 6A, except that a word coverage factor is used in the third option. Like the second option, a document matrix is built (802), a query vector is built (804), and a similarity matrix is built (806) as described above. However, in the third option, a word coverage factor vector is built (808). The word coverage factor vector computes the fraction of query terms that are present in each document when no similarity matrix is used. The word coverage factor vector may be expressed as $$WCF(Q,D_i)=(\Sigma q_j \epsilon Q I(q_j \epsilon D_i))/|Q|$$

where Q is the query, $D_i$ is the ith document in the corpus, $|Q|$ the number of words in the query, I( ) is the indicator function indicating that a term is in a particular document, and i and j are index values. When similarity values are used, the word coverage factor vector may be expressed as:

$$WCF(Q, D) = \frac{1}{|Q|}\sum_{i=1}^{|Q|} I(n(G_i \cap D) > 0)$$

$$G_i = \{w \in V \mid sim(w, q_i) > 0\}$$

where n( ) is the number of elements in a set, sim( ) is a similarity relationship value from the similarity matrix, w is a term in the vocabulary of the documents, and V is the vocabulary, e.g., all the words in the documents. Thus, this formula looks for search terms and similar terms to determine the word coverage factor value for each document.

Figure 8B:
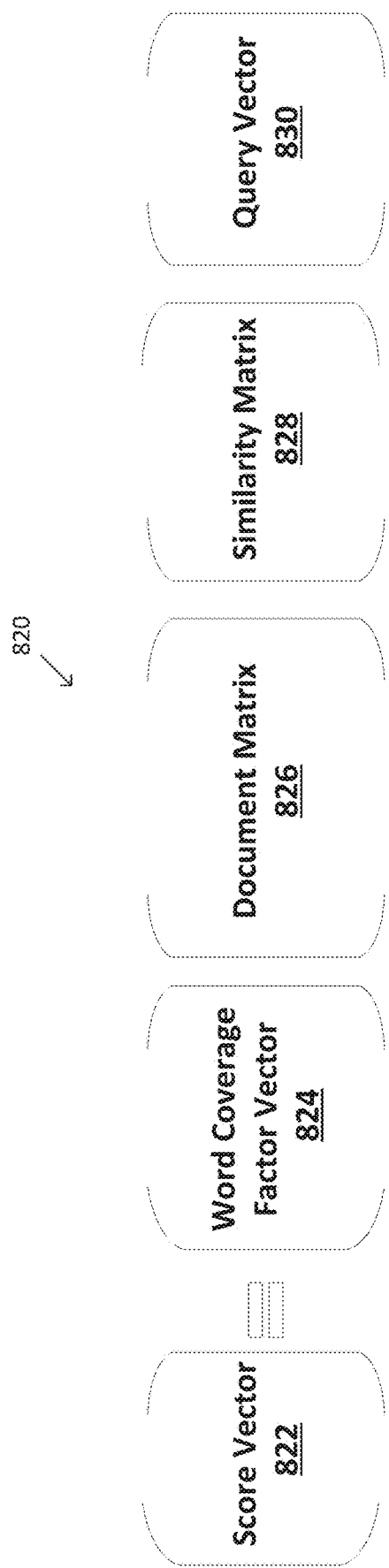
FIG. 8B depicts a calculation of a score vector for documents in a corpus using a word coverage factor vector, a document matrix, a similarity matrix, and a query vector.

The matrices and vectors are multiplied to generate the score vector (812). As shown in FIG. 8B, the score vector 822 is the product of the word coverage factor vector 824, the document matrix 826, the similarity matrix 828, and the query vector 830. The documents are sorted by scores found in the score vector 822.

The use of the word coverage factor vector 824 improves the relevance of the search results but also improves the sizing estimate for the search query. For instance, only values in the word coverage vector above a threshold may be considered. All values below the threshold may be set to 0. Sizing can be determined by counting the documents with non-zero values.

The functionality and processing described herein may be performed by processor(s) of one or more electronic devices, such as a computing device or devices. Computer programming instructions may be executed by the processor(s) to perform the processes and functionality described herein.

Figure 9:
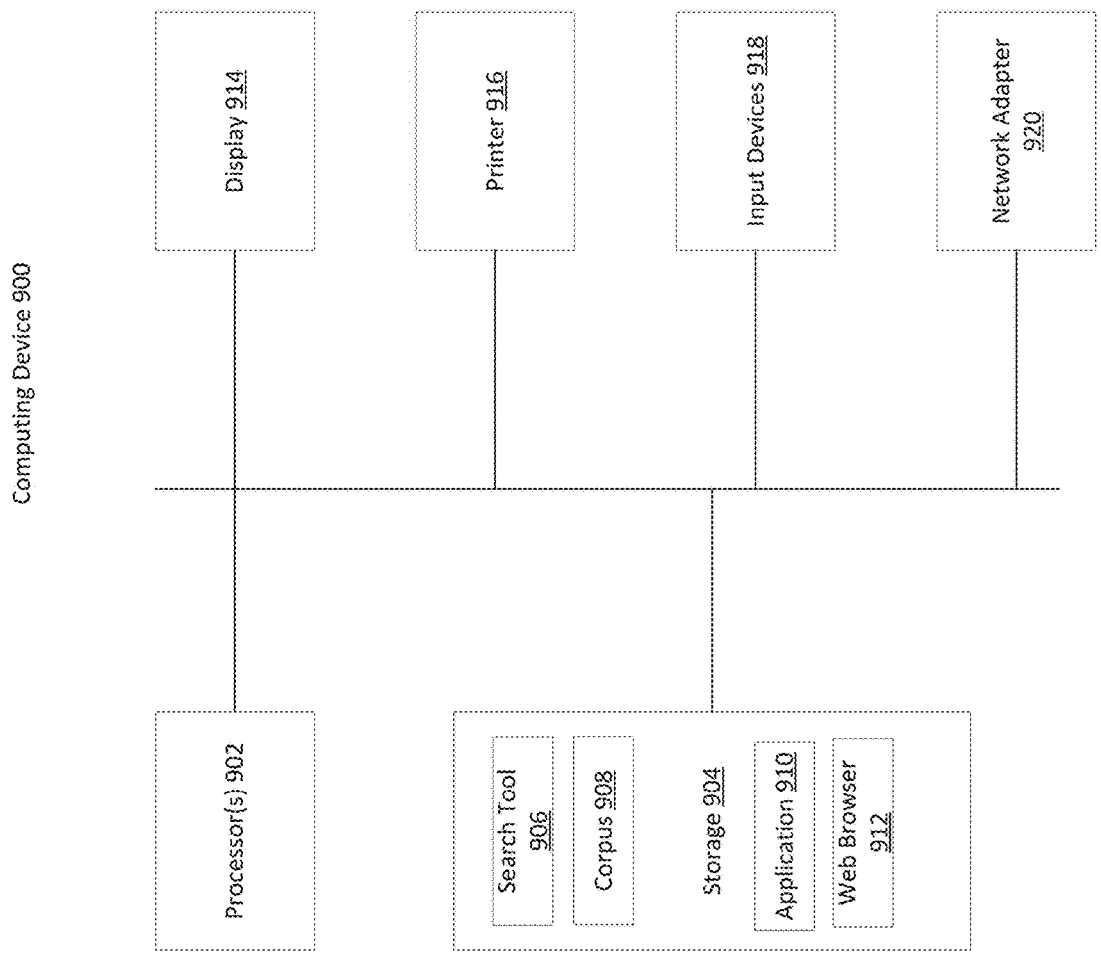
FIG. 9 depicts a block diagram of a computing device suitable for use in exemplary embodiments.

FIG. 9 depicts an example of a computing device 900 that may be used in exemplary embodiments to perform the processing and functionality described herein. The computing device 900 may include one or more processors 902. The processor(s) 902 may be or may include a central processing unit (CPU), a graphics processing unit (GPU), a field programmable gate array (FPGA) or an application specific integrated circuit (ASIC). The processor(s) 902 may execute computer programming instructions stored in the storage 904. The storage 904 may include both primary memory and secondary memory. The storage 904 may include random access memory (RAM), read only memory (ROM), solid state memory devices, optical storage media, magnetic storage media, removable storage media and non-transitory computer-readable storage media in general. The storage 904 may store the search tool 906 that performs the searching and processing of the documents to identify the relevant documents. The storage may include the corpus 908 or portions thereof. The storage 904 may store an application 910 that is responsible for enabling a user to enter a search query and receive search result in return. The storage 904 may also hold a web browser 912 for accessing web sites and web content.

The computing device 900 may include a display 914, such as an LED display, and LCD display or a retinal display. The computing device 900 may include a printer 916 for printing documents and other content. The computing device 900 may include input devices 918, such as a keyboard, mouse, thumbpad, microphone or the like. The computing device 900 may include one or more network adapters 920 for interfacing with networks, such as local area networks, wide area networks, wireless networks, cellular networks or the like.

The exemplary embodiments may also be implemented in a distributed environment, such as in a client/server arrangement. FIG. 10 depicts such an arrangement 1000. A client computing device 1002 is coupled to a network 1004 and has access to server(s) 1006. The client computing device 1002 requests service from the server(s) 1006. For example, the server(s) 1006 may receive a search query, process documents in a corpus to identify relevant documents and return the search results to the client computing device 1002.

FIG. 11 depicts a diagram of server(s) 1100. The server(s) may be a single server or multiple servers. The server(s) may be resident on a single computing device or, when there are multiple servers, on multiple computing devices. The server(s) 1100 may be part of a cloud computing environment in some embodiments. The server(s) 1100 may include one or more processors 1102. The processor(s) 1102 may be like the processor(s) described previously for the computing device 900. Storage 1104 may be provided. The storage 1104 may include the varieties of storage that were described above for storage 904. The storage 1104 may store the search tool 906 and a web interface 1108 for enabling web access, such as over the Internet or an intranet. The storage 1104 may store the corpus 1104 or a portion thereof. The server(s) may include network adapter(s) for interfacing with one or more networks, such as network 1004.

While exemplary embodiments have been described herein various changes in form and detail may be made without departing from the intended scope of the appended claims. For example, the word coverage factor vector may be used with the document matrix and query vector alone in some embodiments.

The invention claimed is:

1. A method performed by a processor of a computing device, the method comprising:
receiving a query, the query containing one or more terms;
processing a corpus of documents with the processor to determine how relevant the documents are to the query, wherein:
the processing comprises scoring the documents in the corpus with the processor for relevance and the scoring includes multiplying at least values of a sparse document matrix, a similarity matrix, and a query vector,
each entry in the sparse document matrix holds a contribution value of an associated term in an associated one of the documents in the corpus,
the similarity matrix holds values indicating a degree of similarity between term pairs; and
the query vector holds values for terms in the query;
sorting the documents in the corpus with the processor by scores assigned by the scoring; and
responsive to the query, generating output, based on the sorting, identifying best scoring ones of the documents.

2. The method of claim 1, wherein columns in the sparse document matrix are associated with terms that are part of documents and rows are associated with documents in the corpus of the documents; and
wherein generating the output includes generating a list of digital links, each digital link corresponding to one of the documents in the corpus, the list of digital links being sorted to correspond to the sorting of the documents by the scores assigned by the scoring.

3. The method of claim 1, wherein the contribution value specifies a measure of a contribution the associated term contributes to a relevance of the associated one of the documents to the query.

4. The method of claim 1, wherein the contribution value is based in part on an inverse document frequency weight of the associated term.

5. The method of claim 1, wherein the query vector includes values for the terms in the vocabulary of the documents indicating if the terms are in the query.

6. The method of claim 1, wherein the query vector has a row per term in the vocabulary of the documents.

7. A method performed by a processor of a computing device, the method comprising:
receiving a query, the query containing one or more terms;
processing a corpus of documents with the processor to determine relevance of the documents to the query, wherein:
the processing comprises scoring the documents in the corpus with the processor for relevance and the scoring includes multiplying at least values of a sparse document matrix, a similarity matrix, and a query vector,
each entry in the sparse document matrix holds a contribution value of an associated term in an associated one of the documents in the corpus,
the similarity matrix holds values indicating a degree of similarity between term pairs,
the query vector holds values for terms in the query; and
sorting the documents in the corpus with the processor by scores assigned by the scoring; and
responsive to the query, generating output, based on the sorting, identifying best scoring ones of the documents.

8. The method of claim 7, wherein the values in the similarity matrix range from 0 to 1, wherein a value of 1 indicates that terms in the term pair are the same and 0 indicates that the terms in the term pair are dissimilar; and
wherein generating the output includes generating a list of digital links, each digital link corresponding to one of the documents in the corpus, the list of digital links being sorted to correspond to the sorting of the documents by the scores assigned by the scoring.

9. The method of claim 7, wherein the term pairs are in the vocabulary of the documents.

10. The method of claim 7, wherein the values in the similarity matrix are based on cosine similarity values, Levenshtein distance values and/or edit distance values.

11. The method of claim 7, wherein rows of the similarity matrix are associated with the terms in the vocabulary and the columns in the similarity matrix are associated with the terms in the vocabulary.

12. The method of claim 7, wherein columns in the sparse document matrix are associated with terms that are part of the vocabulary and rows in the sparse document matrix are associated with documents in the corpus of documents.

13. The method of claim 7, wherein the query vector includes values for the terms in the vocabulary of the documents indicating if the terms are in the query.

14. A method performed by a processor of a computing device, the method comprising:
receiving a query, the query containing one or more terms;
processing a corpus of documents with the processor to determine if each of the documents is relevant to the query, wherein:
the processing comprises scoring the documents in the corpus with the processor for relevance and the scoring includes multiplying at least values of a sparse document matrix, a query vector and word coverage factor vector,
each entry in the sparse document matrix holds a contribution value of an associated term in an associated one of the documents in the corpus,
the query vector holds values for terms in the query, and
the word coverage factor vector holds a value for each of the documents in the corpus;
sorting the documents in the corpus with the processor by scores assigned by the scoring; and
responsive to the query, generating output, based on the sorting, identifying best scoring ones of the documents.

15. The method of claim 14, wherein the values in the word coverage factor vector identify what fraction of terms in the query appear in the associated documents in the corpus; and
wherein generating the output includes generating a list of digital links, each digital link corresponding to one of the documents in the corpus, the list of digital links being sorted to correspond to the sorting of the documents by the scores assigned by the scoring.

16. The method of claim 14, wherein a one of the values in the word coverage factor vector for a selected document in the corpus is a sum of an incidence of each of the terms in the query in the selected document divided by a number of terms in the query.

17. The method of claim 14 wherein the scoring includes multiplying the sparse document matrix, a similarity matrix, the query vector, and the word coverage factor vector and wherein the similarity matrix holds values indicating a degree of similarity between term pairs.

18. The method of claim 17, wherein the values in the similarity matrix range from 0 to 1, wherein a value of 1 indicates that terms in the term pair are the same and 0 indicates that the terms in the term pair are dissimilar.

19. The method of claim 18, wherein a one of the values in the word coverage factor vector for a given document in the corpus is a sum of an incidence of each of the terms in the query in the given document and each of the terms having a non-zero value in the similarity matrix with terms in the query in the given document divided by a number of terms in the query.

20. The method of claim 14, wherein the contribution value specifies a measure of a contribution the associated term contributes to a relevance of the associated one of the documents to the query.

* * * * *